US008480883B2

(12) United States Patent
Stimpson

(10) Patent No.: US 8,480,883 B2
(45) Date of Patent: Jul. 9, 2013

(54) PIPE COUPLING WITH INTEGRATED FILTER AND FLOW DETECTOR

(75) Inventor: Robert William Stimpson, British Isles (GB)

(73) Assignee: DLP Limited, Isle of Man (GB)

( * ) Notice: Subject to any disclaimer, the term of this patent is extended or adjusted under 35 U.S.C. 154(b) by 611 days.

(21) Appl. No.: 12/664,927

(22) PCT Filed: Jul. 17, 2008

(86) PCT No.: PCT/GB2008/002417
§ 371 (c)(1),
(2), (4) Date: Dec. 16, 2009

(87) PCT Pub. No.: WO2009/010742
PCT Pub. Date: Jan. 22, 2009

(65) Prior Publication Data
US 2010/0181244 A1    Jul. 22, 2010

(30) Foreign Application Priority Data
Jul. 18, 2007    (WO) ................ PCT/GB2007/002713

(51) Int. Cl.
*B01D 35/02*    (2006.01)
*B01D 35/143*   (2006.01)
*F16L 27/00*    (2006.01)
*F16L 35/00*    (2006.01)

(52) U.S. Cl.
USPC ............. 210/87; 137/551; 137/801; 138/104; 210/93; 210/449; 210/459; 210/460; 285/18; 285/80; 285/119

(58) Field of Classification Search
USPC .................. 210/87, 232, 449, 450, 459, 460, 210/461, 462, 93; 137/551, 801; 138/104; 285/8, 15, 18, 80, 119
See application file for complete search history.

(56) References Cited

U.S. PATENT DOCUMENTS 289,601   A  * 12/1883  Barnstead ................... 285/8
2,453,465 A  * 11/1948  Sloan ....................... 366/136

(Continued)

FOREIGN PATENT DOCUMENTS
GB        2 261 734  A    5/1993

OTHER PUBLICATIONS

International Search Report published Jan. 22, 2009 for PCT/GB2008/002417 filed Jul. 17, 2008.

(Continued)

*Primary Examiner* — Joseph Drodge
(74) *Attorney, Agent, or Firm* — Fleit Gibbons Gutman Bongini & Bianco, PL; Paul D. Bianco; Martin Fleit

(57) ABSTRACT

A pipe coupling (10) which comprises a coupling body (12) having an inlet end (22) for connection to a water outlet; an outlet end (24) for connection to a water inlet, and a liquid flow passage (26) which connects the inlet and outlet ends (22, 24) and which defines a water flow path (28) through the coupling body (12); a sealable filter and flow detector access opening (14) which is provided on the coupling body (12); and a filter element (16) and a flow detector device (20) which are removably receivable in the coupling body via the access opening and positionable on the flow path to extend across at least a part of the lateral extent of the liquid flow passage.

20 Claims, 4 Drawing Sheets

U.S. PATENT DOCUMENTS

| | | | | |
|---|---|---|---|---|
| 2,501,639 | A * | 3/1950 | Warren | 285/147.2 |
| 2,914,943 | A * | 12/1959 | Ballard | 73/861.353 |
| 3,789,991 | A * | 2/1974 | Krongos | 210/317 |
| 4,873,727 | A * | 10/1989 | Homan | 4/226.1 |
| D354,331 | S * | 1/1995 | Bunke | D23/207 |
| 5,419,363 | A * | 5/1995 | Robinson | 137/360 |
| 5,510,031 | A * | 4/1996 | Knauf et al. | 210/460 |
| 5,882,515 | A * | 3/1999 | Lacy et al. | 210/232 |
| D452,552 | S * | 12/2001 | Spiegelman et al. | D23/209 |
| 6,619,320 | B2 * | 9/2003 | Parsons | 137/624.11 |
| 7,338,594 | B2 * | 3/2008 | Lackey et al. | 210/85 |
| 2004/0055948 | A1 * | 3/2004 | Blum et al. | 210/435 |
| 2005/0098485 | A1 * | 5/2005 | Boyd et al. | 210/87 |
| 2006/0032792 | A1 * | 2/2006 | Warren et al. | 210/87 |
| 2006/0131228 | A1 * | 6/2006 | Truong | 210/449 |

OTHER PUBLICATIONS

International Preliminary Report on Patentability published Jan. 19, 2010 for PCT/GB2008/002417 filed Jul. 17, 2008.
Written Opinion of the International Searching Authority published Jan. 18, 2010 for PCT/GB2008/002417 filed Jul. 17, 2008.

* cited by examiner

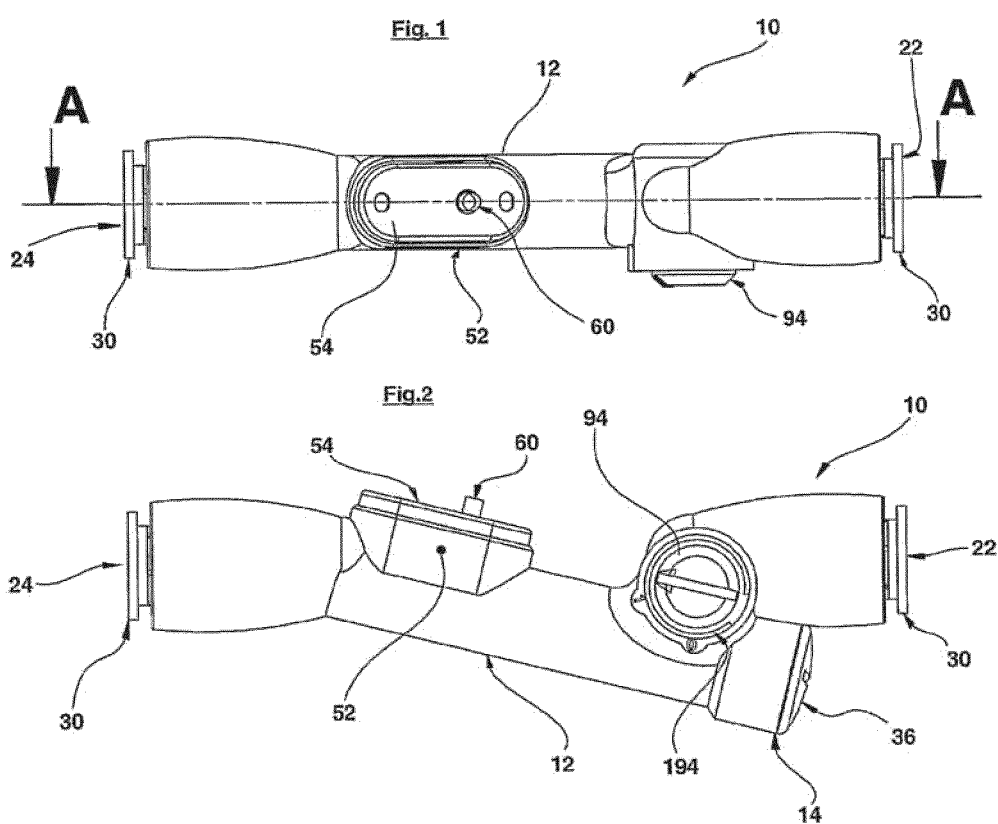

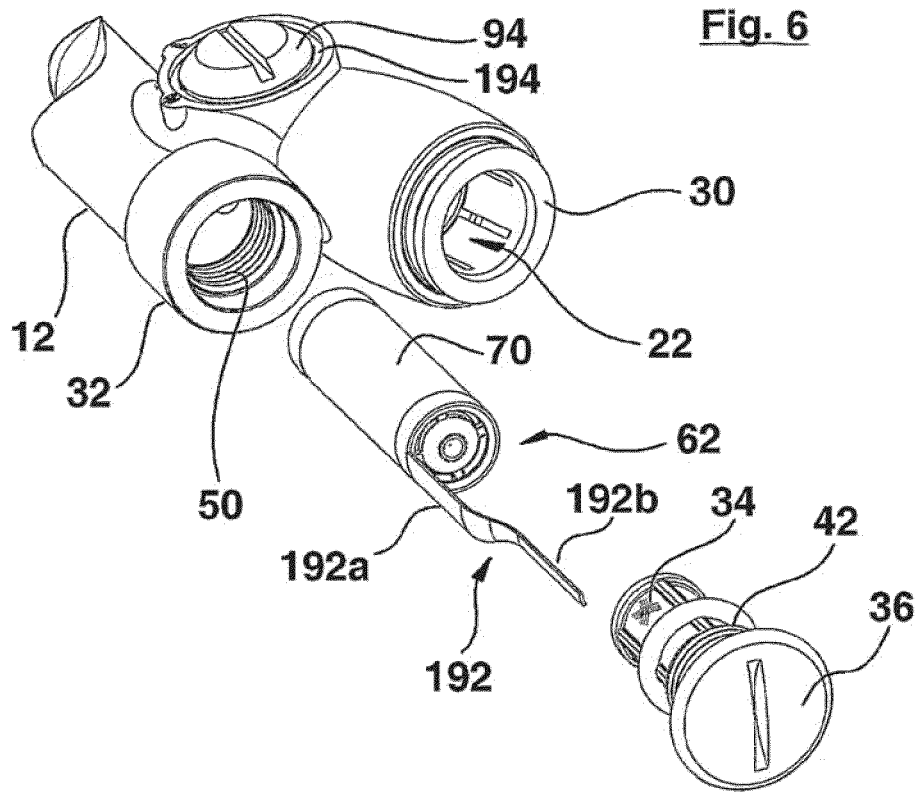

US 8,480,883 B2

PIPE COUPLING WITH INTEGRATED FILTER AND FLOW DETECTOR

FIELD OF THE INVENTION

The present invention relates to a pipe coupling with a removable filter, and to a pipe coupling with a removable flow-detector device.

BACKGROUND OF THE INVENTION

Filters for water-fed devices, such as electric showers, are well known. These filters are often provided at the water inlet or inlets to prevent particulate matter, such as grit and scale, entrained with the mains or tank sourced water supply from entering the components of the shower, such as the pump and water heater.

The filter or filters are located in the water inlet(s) during installation, and the water pipe or pipes are then connected to the inlet or inlets. However, removal then requires the water to be stopped and the or each water pipe to be disconnected from its respective inlet in order to retrieve the filter for cleaning or maintenance. GB2261734 describes a pipe coupling for a water meter that includes a removable filter element but it does not address shower systems.

Furthermore, although flow-detector devices are known for monitoring a flow rate of water into a water-fed device, such as an electric shower, there are instances when use of a certain kind of flow-detector device is more preferable.

It is also not possible to remove a flow-detector device without, as mentioned above, first halting the water supply and then disconnecting the water pipe or pipes.

The present invention seeks to provide solutions to these problems.

SUMMARY OF THE INVENTION

According to a first aspect of the invention, there is provided a pipe coupling comprising a coupling body having an inlet end for connection to a water outlet; an outlet end for connection to a water inlet, and a liquid flow passage which connects the inlet and outlet ends and which defines a water flow path through the coupling body; a sealable filter and flow detector access opening which is provided on the coupling body; and a filter element and flow detector device which are removably receivable in the coupling body via the access opening and positionable on the flow path to extend across at least a part of the lateral extent of the liquid flow passage.

Preferable and/or optional features of the first aspect of the invention are set forth in claims 2 to 12 inclusive.

According to a second aspect of the invention, there is provided a removable flow detector cartridge for use in the first aspect of the present invention, the flow detector cartridge comprising a cylindrical housing, a flow detector element and a sensor.

Preferable and/or optional features of the second aspect of the invention are set forth in claims 13 and 14; inclusive.

BRIEF DESCRIPTION OF THE DRAWINGS

The invention will now be more particularly described, by way of example only, with reference to the accompanying drawings, in which:

FIG. 1 is a plan view of a pipe coupling according to one embodiment of a first aspect of the present invention;

FIG. 2 is a side of the coupling shown in FIG. 1;

FIG. 6 is a partial exploded perspective view of the pipe coupling shown in FIGS. 1 to 5, showing one type of the flow-detectors of FIG. 5 and a filter element.

DETAILED DESCRIPTION OF THE INVENTION

Figure 3:
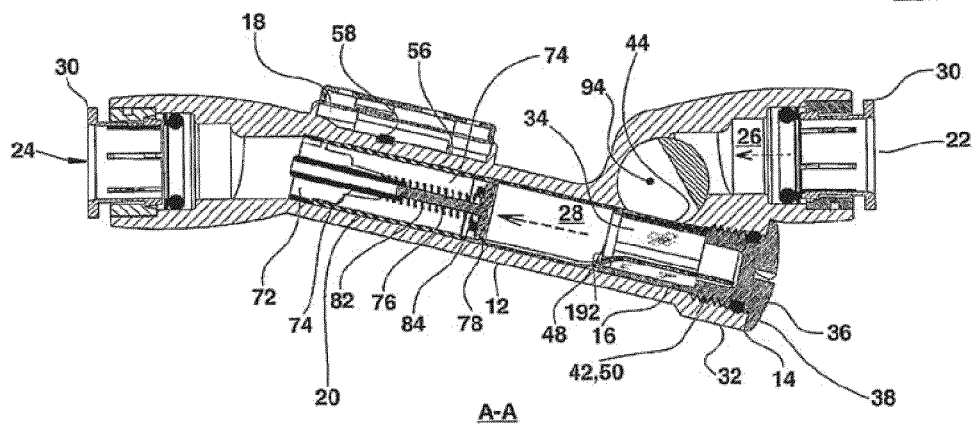
FIG. 3 is a cross-sectional view through line A-A of FIG. 1, shown with an isolation valve in the closed position.
Figure 4:
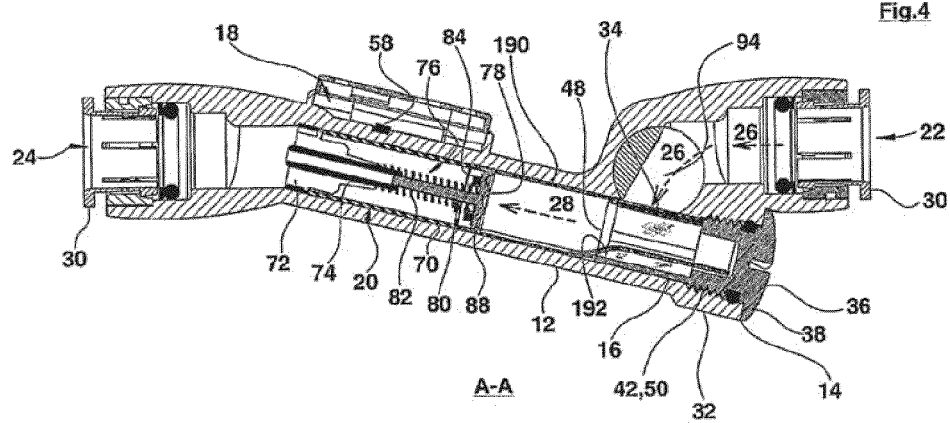
FIG. 4 is a cross-sectional view of the coupling shown in FIG. 3, shown with the isolation valve in the open position.

Referring to the accompanying drawings, there is shown a pipe coupling 10 which comprises a coupling body 12, a sealable filter and flow detector access opening 14 in the coupling body 12, a removable filter element 16 and a removable flow-detector device 20 locatable in the coupling body 12 through the filter and flow detector-access opening 14.

The coupling body 12 is typically an elongate tubular hollow element moulded from plastics material. The coupling body 12 includes a water inlet end 22, a water outlet end 24 and a main liquid flow passage 26 which connects the inlet and outlet ends 22, 24 for liquid communication therebetween. A liquid flow path 28 is thus defined through the coupling body 12 by the inlet end 22 and the outlet end 24.

Both inlet and outlet ends 22, 24 are preferably provided with push-fit and quick-release pipe couplers 30, such as John Guest Speedfit®, to enable releasable push-in connection to a water outlet and a water inlet, respectively. Of course, however, any kind of pipe coupler can be utilised, including a traditional screw type or compression fit coupler.

A filter housing 32 is formed on the coupling body 12, adjacent to but spaced from the inlet end 22. The housing 32 extends in line with the coupling body 12 at an angle to the longitudinal extent of the main flow passage 26. The filter and detector access opening 14 is provided in an end of the filter housing 32 remote from the coupling body 12, and the other end of the housing is open to provide access to the flow passage 28. Due to the angle of the filter housing 32, the access opening 14 also extends at an angle to the inlet end 22. This angularity allows easier user-access to the filter housing 32, filter element 16 and flow detector device 20 once the pipe coupling 10 is installed. This inclined angle also permits the inlet 22 and outlet 24 to be coaxial, simplifying initial installation into a pipe run or line.

It can be envisaged by those skilled in the art that other configurations of the inlet and outlet and access opening may be created such that the position of two or more may be mutually at 90°, 180° or other angular positions to suit particular applications.

The insertable flow-detector device 20 is provided in the coupling body 12, spaced downstream from the filter housing 32 and adjacent to but spaced from the outlet end 24. The flow-detector device 20 is generally circular in cross section and extends in parallel with the longitudinal extent of the flow passage 28 of the coupling body substantially in line with the filter housing and element.

Additionally, a split spacer element 190 is provided between the detector device 20 and filter element 16. This ensures an adequate spacing is maintained between the detector and filter to minimise flow turbulence at entry to the detector.

An elongated tab 192 is connected to the flow detector device 20. This is constructed such that, in the assembled coupling, the tab follows the edge of the split spacer element 190 and protrudes up into the interior of the filter element. In this manner, when the filter is withdrawn from the body of the coupling via the access opening, the tab 192 becomes visible to enable the detector device and spacer to be easily removed from the coupling via the access opening (see FIG. 6). Alternatively, the spacer, tab and filter element may be constructed as a single injection moulded plastics material part or parts which may be snap-fixedly assembled to create a single cartridge comprising filter, spacer and flow detector device. Alignment guides (not shown) may be provided on the surface of one or more of the components of the coupling to assist in the correct reassembly of the parts. The split spacer 190 may be replaced by the provision of engagement means on the elongated tab for receiving a part of the filter to ensure it is spaced apart from the detector device.

An isolation valve 94 is provided between the inlet and the filter element for temporary shut-off of the water flow through the coupling during removal of the filter and/or detection device. The isolation valve comprises a cylindrical valve unit that has a top cap with a recess for receiving a bladed instrument to effect rotational movement of the valve between and open and closed positions. The valve is provided with elastomeric o-ring seals 193 to maintain a water-tight seal during operation and is retained in the body of the coupling by means of circular wire clip 194 located within a semi-circular radial groove provided on the inner surface of the coupling body with the inner surface of the clip bearing on a flange of the valve. Further seals (not shown) may be used when the valve is in the closed orientation. This arrangement is standard in the art and therefore there is no need to describe this in any further detail. It is also to be appreciated that the coupling body may be provided with a sealed blanking element (not shown) in place of the valve 94 for locating in the recess to provide an unvalved variant of the invention.

In the embodiment shown, the filter element 16 comprises an elongate mesh filter cage 34, and a screw-threaded cap 36 provided at one end of the cage 34. The cap 36 includes a head 38 and an o-ring seal 40 between the head 38 and the screw-thread 42.

When the filter element 16 is fully received in the filter housing 32, lowermost edges 44 of the mesh cage 34 abut on surfaces of the flow passage 26 in the coupling body 12. As such, the mesh cage 34 extends fully across the lateral extent of the flow passage 26. Consequently, the filter element 16 cannot be bypassed, and the flow path 28 passes through the filter element 16 by entering from one side 44 of the mesh cage 34 and exiting through the open bottom 48.

The mesh of the cage 34 has apertures which are of sufficiently small dimension to catch all typical detritus and particulate matter entrained in a water supply. For example, an aperture dimension of 0.1 millimetre is typically sufficient.

The cage 34 can have a circular or non-circular cross-section.

Although a filter cage is suggested for strength, it is feasible that a single planar or arcuate mesh filter could be used. Such a planar filter may beneficially be located in a wedge shaped recess formed in the walls of the bore of the housing and being retained by a version of the cap 36 which has been truncated below the thread 42 to remove the integral filter section.

The filter housing 32 includes an interior screw-thread 50 for mating connection with the screw-thread 42 on the cap 36 of the filter element 16. As such, the filter element 16 can be wound in to and out of the filter housing 32. The o-ring seal 40 prevents leakage from the filter housing 32, when the pipe coupling 10 is in use. Alternatively, the filter 34 may be a separate part to the housing 36, 38.

A one-way check valve (not shown) may be incorporated in the filter housing 32 so that, with the filter element 16 withdrawn, water in the coupling body 12 is prevented from escaping through the access opening 14. With the check valve closed, the flow passage 28 can remain open so that the device attached to the outlet end 24 of the pipe coupling 10 can continue to be used.

The flow-detector device 20 includes a flow-detector element 56 and a sensor 58 which is connected or connectable to, typically remote, control circuitry (not shown). Wiring of the sensor 58 which is located in external housing 52 extends through an access opening 92 via a water-tight seal which is preferably an epoxy or silicon potting compound retained during the compound solidification and curing process by cover 54 which is located in a recess 18 of the housing 52. Housing recess 18 may also conveniently contain such signal processing electronics or other interfacing equipment as may be required.

In the embodiment illustrated, the flow detector device 20 includes a flow sensing element 74 having a piston-like plunger 76 comprising a head 78 and a shaft 80. Although formed integrally as one-piece, the head 78 and the shaft 80 can be separate elements connected together. The shaft 80 is accommodated in a coil spring 82 and a magnetic element 84 is interference fixedly retained within the head 78. The spring 82 and plunger 76 are again mounted in a cylindrical open-ended housing 70, and a spoked support 72 is provided at a downstream end of the housing 70, and an open end cap 88 with an in-turned flange is provided at the upstream end. The spring 82 presses against the downstream spoked support 72 in order to urge the head 78 in an upstream direction against inflowing water. In an at-rest condition, radially extending arms of the head 78 abut the in-turned flange of the upstream end cap 88.

The detector device 56 is preferably in the form of an insertable cartridge, as illustrated in FIG. 6. The cartridge comprises the cylindrical housing 70 having an elongated rod 192*a* extending from one end thereof, the rod curving inwardly to provide a tab 192*b* at its free end. The cartridge 62 is dimensioned to be a tolerance fit in the flow passage 28. Although it is preferable that the cartridge 62 extends across the entire lateral extent of the flow passage 28, it is not necessarily essential that the entire flow path 28 must pass through the flow-detector device 20. Some minor or insignificant bypass flow is acceptable under certain conditions where the configuration for leakage or bypass flow is catered for in the flow signal detection equipment which may be attached to the sensor cable. It is envisaged that the cartridge may be optionally specified by the installer and adhesively and permanently installed by the manufacturer prior to delivery to the installer.

The coupling body 12 also includes the sensor for monitoring movement of the moving flow element 74. The sensor 58 is preferably a Hall-effect sensor. To enable the Hall-effect sensor to operate, a magnet 84 is provided at or in the head 78. This can be formed integrally by using a plastics material having a magnetic material in suspension therewithin, or a separate magnetic element can be provided at the head 78.

Figure 5:
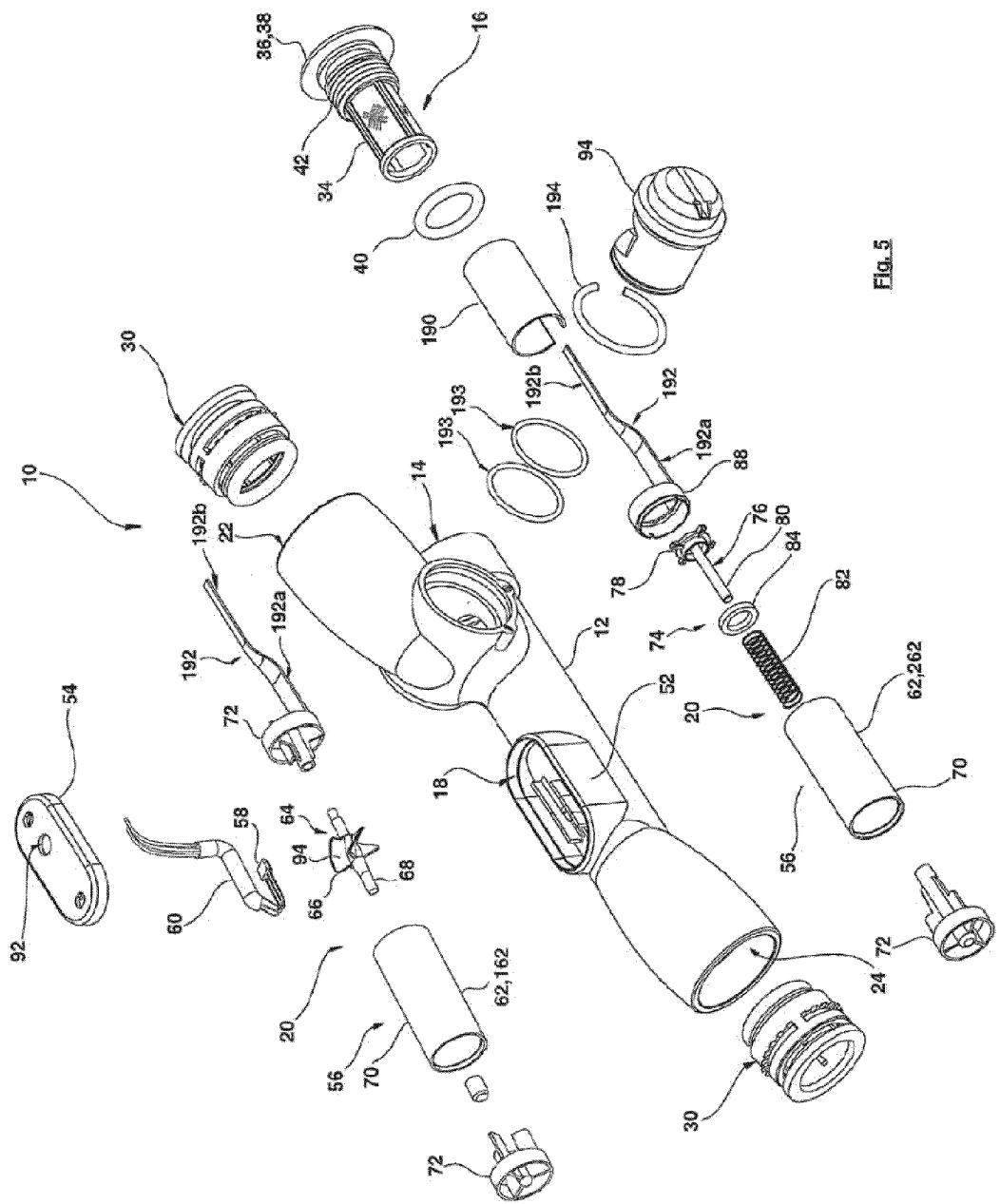
FIG. 5 is an exploded perspective view of the pipe coupling, showing two different types of flow detector and a filter element.

The flow-detector device so described is a simple ON/OFF device. An alternative embodiment to this is a flow sensitive rotor device 94. This is shown in FIG. 5, along with the ON/OFF device referred to above. The rotor is magnetic, preferably manufactured by injection moulding a magnetic powder laden plastics material. The rotor is located on an integral shaft 68 which is conveniently retained in end caps 72 which are retained by housing 70 to form the complete detector device. Rather than the single magnetic element 84 activating the sensor 58 at a flow rate determined by the spring resistance to the force generated by the flow, on head 78, the rotor device 64 will trigger the sensor as each blade 66, 94 passes the sensor 58 thereby affording a more accurate resolution of the fluid flow. The advantage of this second type of detector cartridge is that the sensor monitors and outputs a variable signal corresponding to the variable rate of flow of water through the pipe coupling, thus allowing an associated device, such as a waste-water pump, to be continuously and variably controlled.

A flow-detector element to be used as part of the flow-detector device can be selected from amongst a plurality of flow-detector elements, thus providing the installer or manufacturer with a selection of options depending on the installation environment and necessity. By use of a cartridge, removal of the flow-detector element, for example for maintenance requirements, is also vastly simplified. It is possible for removal to occur without requiring disconnection of the pipe coupling at either end.

The present invention provides a pipe coupling that has a single access opening for both the filter element and the flow-detector device. The flow detector and filter can thus be removed together by extraction through a single opening. FIG. 6 of the accompanying drawings illustrates how the flow detector cartridge 62 can be pulled from the body 12 of the coupling following removal of the filter element 34 that is attached to the sealing cap 36.

It is preferable for the opening to be separate of the inlet and outlet ends of the coupling body as shown in the accompanying drawings. However, if insertion into the coupling body is via an end of the coupling body, then it is feasible that the flow detector element or cartridge is insertable through the inlet end. In this case, it is preferable that the cartridge is inserted before the filter element is inserted. The cartridge is inserted to a position which is downstream of the position of the filter element, and the filter element is then inserted into the coupling body.

The illustrated embodiments show the detector device being removable from the coupling through the opening of the filter housing. However, it is to be appreciated that the filter element could be removable via a detector device opening. In such an embodiment, it is preferred to provide a filter element that is formed integrally with a spacer element. A separate sealing cap for securing the filter element and detector device within the coupling body is then provided.

Thus, the present invention provides a flow sensor with integral filter and push-fit pipe connections that may be conveniently combined into a unit to allow easy and rapid service maintenance and adjustment of the sensing element without the need to return it to the manufacturer or remove the coupling from the pipe line.

The embodiments described above are given by way of examples only, and various other modifications will be apparent to persons skilled in the art without departing from the scope of the invention, as defined by the appended claims.

The invention claimed is:

1. A pipe coupling comprising:
    an elongate coupling body having an inlet end for connection of the coupling body to a water outlet, an outlet end for connection of the coupling body to a water inlet, and a liquid flow passage through the length of the coupling body which connects the inlet and outlet ends and which defines a liquid flow path through the coupling body;
    a sealable access opening which is provided on the coupling body in order to access the liquid flow passage; and
    a filter element and a flow detector device which are removably receivable within the liquid flow passage of the coupling body via the access opening and positionable on the flow path to extend across at least a part of the lateral extent of the liquid flow passage.

2. A pipe coupling as claimed in claim 1 further comprising an isolation valve for temporary closure of the liquid flow path through the coupling body.

3. A pipe coupling as claimed in claim 1 further comprising a spacer element provided between the filter element and the flow detector device.

4. A pipe coupling as claimed in claim 3 wherein the spacer element is a separate component provided between the filter element and flow detector device.

5. A pipe coupling as claimed in claim 3 wherein the spacer element is formed integrally with the filter element and/or flow detector device.

6. A pipe coupling as claimed in claim 1 wherein the access opening is spaced from the inlet and outlet ends and is provided separate thereto.

7. A pipe coupling as claimed in claim 6, wherein the access opening extends at an oblique angle to the inlet.

8. A pipe coupling as claimed in claim 1 further comprising a filter housing for receiving the filter element, the filter housing including a sealing cap and a threaded region for engagement with a complementary threaded region provided in the access opening of the coupling body.

9. A pipe coupling as claimed in claim 1 wherein the flow detector device and filter element are provided as a single unit in a spaced apart configuration for insertion in the access opening and a separate cap is provided for sealing the access opening.

10. A pipe coupling as claimed in claim 1, wherein the flow-detector element is or includes a removable detector cartridge.

11. A pipe coupling as claimed in claim 10 wherein the removable detector cartridge includes at least one protruding tab.

12. A pipe coupling as claimed in claim 1, wherein the flow-detector device includes one of a flow rate detecting element, and an ON/OFF switch element.

13. A removable flow detector cartridge for use in a coupling as claimed in claim 1, the cartridge comprising a cylindrical housing, a flow detector element of the flow detector device, and a sensor of the flow detector device.

14. A removable flow detector cartridge as claimed in claim 13 further comprising a spaced apart filter element of the pipe coupling.

15. A pipe coupling comprising:
    an elongate coupling body having a tubular internal flow passage permitting a fluid to pass from an inlet opening of the coupling body to an outlet opening of the coupling body along a flow path through the internal flow passage, the coupling body including an integrally formed access opening provided on the coupling body to access the internal flow passage, the access opening angled acutely with respect to the direction of the flow path at the inlet opening; and
    a filter and a flow detector insertable into the internal flow passage through the access opening and positionable on the flow path to extend across at least a part of the lateral extent of the internal flow passage.

16. The pipe coupling as claimed in claim 15, wherein the flow detector is spaced downstream from the filter on the flow path.

17. The pipe coupling as claimed in claim 15, further comprising an isolation valve provided adjacent the inlet opening for at least partially blocking the flow path between the inlet opening and the fully inserted first and second devices.

18. The pipe coupling as claimed in claim 15, further comprising a cap for sealing the access opening.

19. The pipe coupling as claimed in claim 15, wherein the access opening is substantially aligned with the flow path at the fully inserted first and second devices.

20. The pipe coupling as claimed in claim 15, wherein the inlet end and the outlet end of the coupling body is substantially coaxial.

* * * * *